(12) United States Patent
Dorao et al.

(10) Patent No.: US 9,168,475 B2
(45) Date of Patent: Oct. 27, 2015

(54) SEPARATOR FOR A GAS/LIQUID FLOW

(75) Inventors: Carlos A. Dorao, Trondheim (NO); Maria Fernandino, Trondheim (NO)

(73) Assignee: INNSEP AS, Trondheim (NO)

( * ) Notice: Subject to any disclaimer, the term of this patent is extended or adjusted under 35 U.S.C. 154(b) by 795 days.

(21) Appl. No.: 13/377,345

(22) PCT Filed: Jun. 11, 2010

(86) PCT No.: PCT/NO2010/000224
§ 371 (c)(1),
(2), (4) Date: Mar. 5, 2012

(87) PCT Pub. No.: WO2010/143978
PCT Pub. Date: Dec. 16, 2010

(65) Prior Publication Data
US 2012/0151887 A1 Jun. 21, 2012

(30) Foreign Application Priority Data
Jun. 11, 2009 (NO) .................................. 20092260

(51) Int. Cl.
*B01D 45/14* (2006.01)
*B01D 46/00* (2006.01)

(52) U.S. Cl.
CPC .............. *B01D 45/14* (2013.01); *B01D 46/003* (2013.01); *B01D 46/0056* (2013.01)

(58) Field of Classification Search
USPC ................... 55/307, 421, 434, 437, 442–447, 55/477–465, 482, 484–489
See application file for complete search history.

(56) References Cited

U.S. PATENT DOCUMENTS

| | | | |
|---|---|---|---|
| 1,075,736 A | 10/1913 | Spiegel | |
| 3,045,411 A | 7/1962 | Dalrymple et al. | |
| 3,763,631 A * | 10/1973 | Horn et al. | 95/154 |
| 3,800,514 A * | 4/1974 | Avondoglio et al. | 55/319 |
| 3,857,687 A * | 12/1974 | Hamilton et al. | 55/337 |
| 3,860,403 A * | 1/1975 | Aoi | 55/315.2 |
| 3,884,660 A * | 5/1975 | Perry et al. | 55/396 |
| 4,094,401 A | 6/1978 | Sanderson | |

(Continued)

FOREIGN PATENT DOCUMENTS

| | | | | |
|---|---|---|---|---|
| CN | 101222964 A | | 7/2008 | |
| DE | 10 2004 048 539 A1 * | 4/2006 | | F01M 13/04 |

(Continued)

OTHER PUBLICATIONS

International Search Report and Written Opinion mailed Sep. 3, 2010 (PCT/N02010/000224); ISA/EP.

(Continued)

*Primary Examiner* — Duane Smith
*Assistant Examiner* — Sonji Turner
(74) *Attorney, Agent, or Firm* — Banner & Witcoff, Ltd.

(57) ABSTRACT

The invention is separator for separating a fluid flow of gas with droplets (G, L), comprising an inlet (10) for the gas to be separated to a rotor (4) with a mesh (5) for coalescing the droplets (L) and releasing coalesced liquid (L') from a peripheral part (50) of the rotor (4). Novel features of the separator is that—the mesh (5) generally forms an axial passage for said gas (G) from the inlet (10), through said rotor (4), to an outlet (20) for liquid depleted gas (G'), and—the rotor (4) with the mesh (5) is arranged for transporting the coalesced liquid (L') laterally out of the axial passage to a wall (6) arranged for receiving the coalesced liquid (L').

28 Claims, 18 Drawing Sheets

(56) References Cited

U.S. PATENT DOCUMENTS

| | | | |
|---|---|---|---|
| 4,135,898 A * | 1/1979 | Rosengard | 55/419 |
| 4,152,128 A * | 5/1979 | Lywood | 55/400 |
| 4,189,310 A * | 2/1980 | Hotta | 55/317 |
| 4,627,406 A * | 12/1986 | Namiki et al. | 123/573 |
| 4,994,097 A * | 2/1991 | Brouwers | 55/317 |
| 5,073,177 A * | 12/1991 | Brouwers | 55/317 |
| 5,334,239 A | 8/1994 | Choe et al. | |
| 5,454,945 A * | 10/1995 | Spearman | 210/315 |
| 5,750,024 A * | 5/1998 | Spearman | 210/315 |
| 6,251,168 B1 * | 6/2001 | Birmingham et al. | 95/268 |
| 6,451,093 B1 * | 9/2002 | Miles | 95/270 |
| 6,517,612 B1 * | 2/2003 | Crouch et al. | 95/277 |
| 6,627,166 B1 * | 9/2003 | Simon | 423/210 |
| 6,640,792 B2 * | 11/2003 | Harvey et al. | 123/572 |
| 6,709,477 B1 * | 3/2004 | Hakansson et al. | 55/401 |
| 6,814,768 B2 * | 11/2004 | Keller | 55/304 |
| 6,858,056 B2 * | 2/2005 | Kwan | 55/400 |
| 6,858,067 B2 | 2/2005 | Burns et al. | |
| 7,063,734 B2 * | 6/2006 | Latulipe et al. | 96/189 |
| 7,550,032 B2 * | 6/2009 | Brouwers et al. | 95/141 |
| 7,569,094 B2 * | 8/2009 | Kane et al. | 95/28 |
| 7,662,220 B2 * | 2/2010 | Fukano et al. | 55/401 |
| 7,857,879 B2 * | 12/2010 | Egger | 55/337 |
| 7,900,749 B2 * | 3/2011 | Regonini | 184/6.23 |
| 8,123,838 B2 * | 2/2012 | Kane et al. | 96/1 |
| 8,128,732 B2 * | 3/2012 | Hoijtink et al. | 95/35 |
| 2003/0089656 A1 | 5/2003 | Kwan et al. | |
| 2006/0225386 A1 * | 10/2006 | Brouwers et al. | 55/319 |

FOREIGN PATENT DOCUMENTS

| | | | |
|---|---|---|---|
| DE | 102004048539 A1 | 4/2006 | |
| EP | 1344559 A1 | 9/2003 | |
| WO | 2006132527 A1 | 12/2006 | |
| WO | 2009099339 A1 | 8/2009 | |
| WO | WO 2009/005355 A1 * | 8/2009 | B01D 45/14 |

OTHER PUBLICATIONS

Sulzer Chemtech: "Gas/Liquid Separation Technology".

C. Verlan (1989): "Performance evaluation of impingement gas-liquid separators in Multiphase Flow" in Proceedings of the 4th International Conference. Cited in application.

SC. Verlan (1989): "Performance evaluation of impingement gas-liquid separators in Multiphase Flow" in Proceedings of the 4th International Conference. Cited in application [retrieved on Apr. 3, 2012].

Mar. 5, 2014—(CN)—The Notification of the Second Office Action 201080026063.4.

Jun. 6, 2014—(MX) Memo concerning the Official Action Reported in the covering letter—MX/A/2011/013195.

* cited by examiner

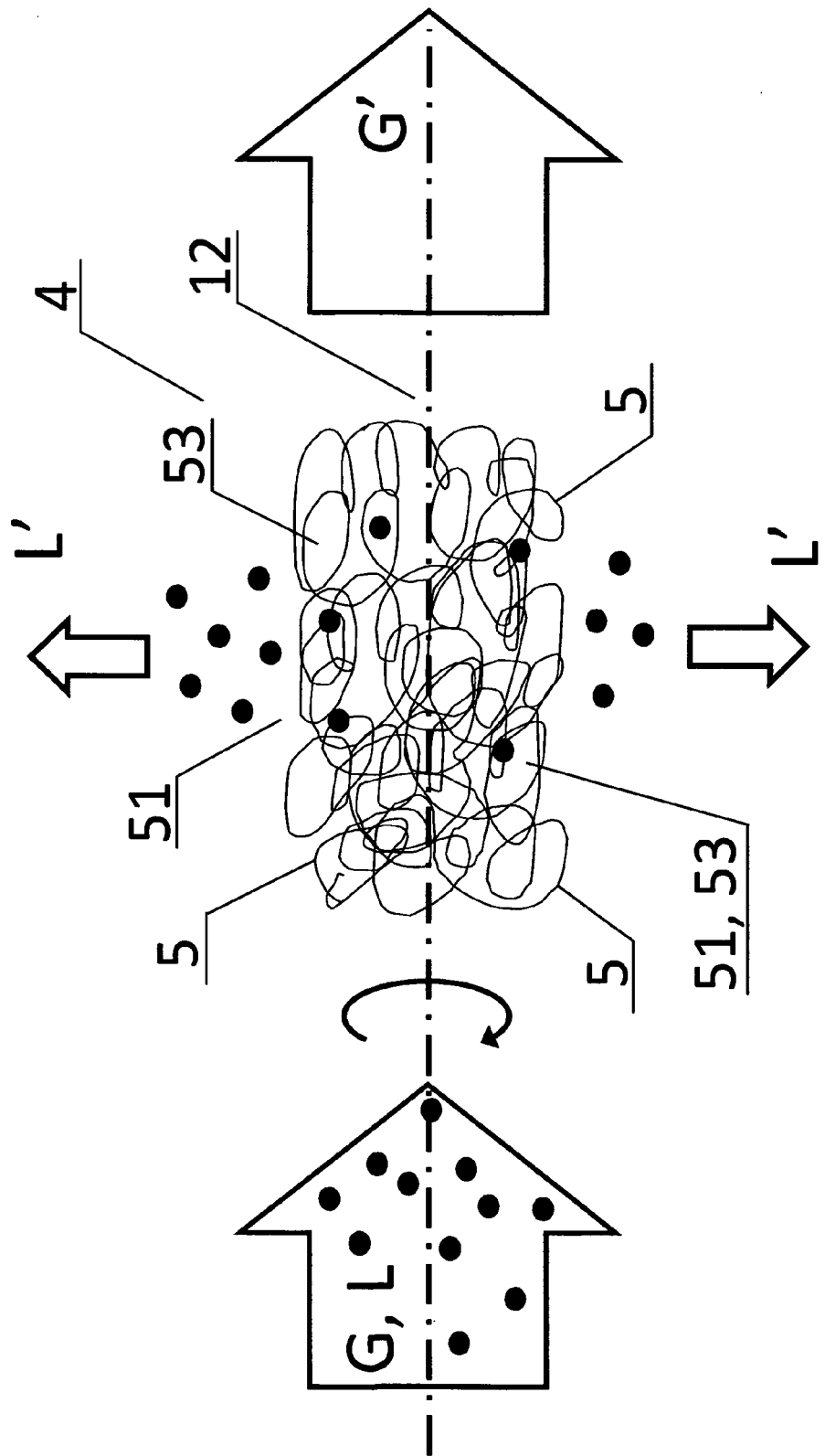

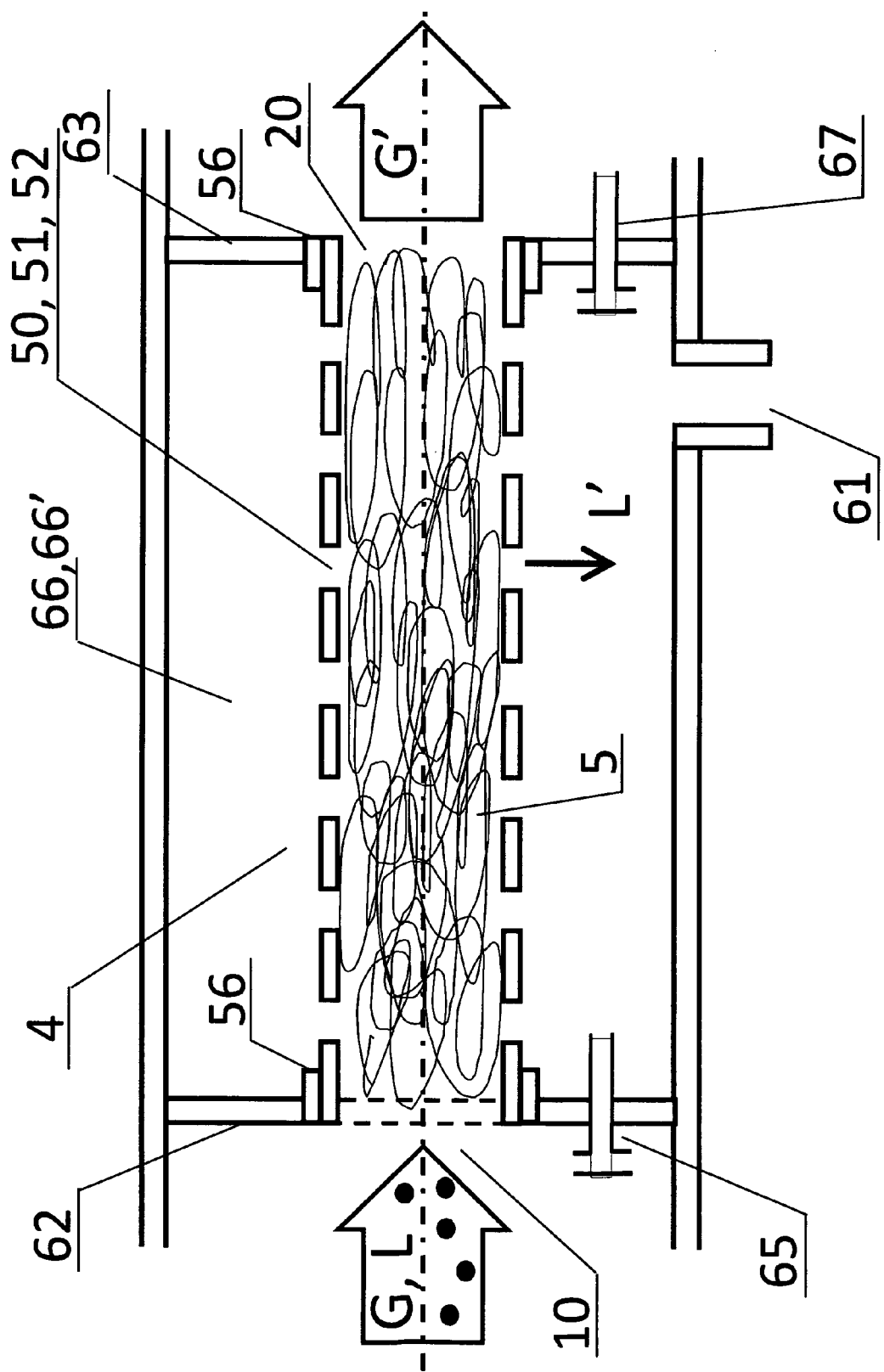

SEPARATOR FOR A GAS/LIQUID FLOW

CROSS-REFERENCE TO RELATED APPLICATIONS

The present application is a U.S. National Phase filing of International Application No. PCT/NO2010/000224 filed on Jun. 11, 2010, designating the United States of America and claiming priority to Norway patent application No. 20092260, filed Jun. 11, 2009. The present application claims priority to and the benefit of all the above-identified applications, and all the above-identified applications are incorporated by reference herein in their entireties.

The present invention relates to a separator for separating a fluid flow of gas with droplets. The liquid may be present as droplets in the gas, or may be liquefied to a spray of droplets in the gas, and then separated using the present invention. More specifically, an embodiment of the invention comprises a rotor with a mesh for being passed by the initially mixed gas and coalescing the droplets. These liquid droplets may be collected by rotating the mesh and collecting the resulting flow of coalesced droplets on a surrounding screen wall, allowing resulting liquid depleted gas to be transported axially out of the rotating mesh.

BACKGROUND ART

For separating a fluid flow of liquid and gas several different devices may be used. One major class is pure settling devices comprising relatively large gas-liquid separator tanks for receiving mixed fluid flows and stratifying the constituents. At the inlet a diffuser reduces the fluid flow velocity, whereby the heavier fluids, usually liquids, are collected by gravity in a sump and led to a liquid outlet. Stratified oil and water may be drained at different elevation levels. Gases are separated from the liquids due to gravity and be assembled above the liquid surface, and led to a gas outlet. In the separated gas flow a coalescing mesh may be arranged for catching droplets. The so formed droplets on the mesh may be collected by drain channels in or below the mesh and led down to the liquid sump. At low gas flow rates the liquid may usually be removed but at high gasflow rates there is a risk that liquid may be carried over the mesh. A high gas flow rate may also incur flooding of the mesh resulting in undesired pressure peaks. A major problem of gas-liquid separator tanks is the large required volume and the time usually required for allowing gravitational separation. Secondary droplet formation may occur due to the gas flow through the mesh. If the allowable space for the separation to take place is confined, such as in subsea petroleum production or even downhole separation of produced fluids, a compact solution is required.

Pressure or dynamic energy of the fluid flow to be separated may be utilized in a so-called cyclone separator. The inflowing mixture of gas and liquid is set into rotation either by using a high velocity tangential inflow path or by using a set of turbine blades to set the mixed fluid flow into rotation, both in a cylindrical housing. The lower-density gas will collect at the core of the fluid cyclone and the higher density liquids such as oil or water will collect at the periphery of the flowing cyclonic fluid body. The peripherally collected fluid may form a liquid film or drops on the wall of the cyclonic housing depending on the proportion of liquid to gas. The liquid part of the flow is then removed by having it flow down the wall before collection. A significant problem is that the velocity of the gas flow will shear on the liquid which may incur re-entrainment of droplets from the separated liquid back into the gas flow.

U.S. Pat. No. 6,858,067 to Burns "Filtration vessel and method for rotary gas compressor system" describes a filtration vessel for separating lube oil droplets entrained by compressed gas from a rotary screw compressor. The gas is set into rotation on entering a vortex knockout region in the lower part of the vertical cylindrical filtration vessel, and the lighter fluids in the core of the vortex rise to the upper portion of the cylindrical vessel to pass through a static, hollow concentric coalescing filter which is arranged as a non woven fine mesh for collecting and draining off remaining droplets of lube oil from the compressed gas stream passing vertically and radially, the droplet-free gas eventually leaving through a lateral upper outlet nozzle.

Several patent publications describe the use of coalescing filters for removing droplets from gases. U.S. Pat. No. 6,251,168 to Birmingham, "High efficiency gas scrubber using combined coalescing media and centrifugal cyclone", describes a two-stage cyclone separator tank for high-quality separation of a wellhead gas stream containing an undesired high proportion of droplets or mist. Birmingham's device may separate a gas/liquid mixture which is a one-component, two-phase system or a multi-component system. An upper secondary cyclone separator is provided with tangential inlet vanes for forming the secondary cyclone motion of the gas/liquid entering the secondary cyclone. The risk of liquid re-entrainment into the gas flow is described. A coalescing filter is arranged covering the entrances to the tangential inlet vanes for initiating droplet growth for enhancing the cyclone separation effect of the secondary stage.

U.S. Pat. No. 5,334,239 to Choe, "Passive gas separator and accumulator device" describes an in-line axially arranged cylindrical filter for being arranged on a liquid line. Helical "swirler" vanes near the inlet induce a vortex motion in the liquid, and a centrally arranged static coalescing filter entraps gas bubbles and the cyclonic motion leads the coalesced gas bubbles near the centre of the cylindrical device, and lets the liquid pass peripherally. The device is particularly suited for separating out Helium bubbles from liquid Lithium such as may arise by radiation in nuclear power plants.

Published U.S. patent application US2006/0225386 describes a method for removing gaseous components such as $CO_2$ or $H_2S$ from a contaminated natural gas stream. The method comprises first expanding the contaminated gas stream in an expander to obtain an expanded gas stream. This may take place in a turbine expander. Secondly, part of the contaminant in the gas stream is allowed to liquefy to form a dispersion of a contaminant enriched liquid phase in a contaminant depleted gaseous phase. Thirdly, the liquid phase and the gaseous phase are led into a centrifugal separator barrel with a bundle of axis-parallel channels. The separated, contaminant enriched, liquid phase is taken out axially, at an outer radial position. The separated, contaminant depleted, gas is taken out at an inner radial position and may then be recompressed such as in a turbine compressor, and reprocessed. A disadvantage of the axis-parallel channels is that they may be overfilled and partly block the gas passage. There is thus a risk of re-entrainment of liquid into the gas flow.

U.S. Pat. No. 1,075,736 to Spiegel describes an apparatus for separating liquid particles from gases. The apparatus comprises an inlet for the gas with the liquid particles to a wider cylindrical channel with a rotating drum of wide diameter, and to an outlet of lesser diameter. The rotating drum is provided with fan blades about a tapered upstream portion. The fan blades are for guiding the gas flow radially outward into the peripheral cylindrical channel about the wide drum. Downstream the gas is then radially forced inward to the narrower axial outlet of the cylindrical channel. Fine meshed screens are fixed on the surface of the drum in the annular space about the cylinder surface of the rotating drum. The fine meshed screens are for sweeping through the wet gas flow for coalescing the liquid particles in the gas flow. The coalesced liquid is then centrifugally forced out laterally and drained off in a sump.

U.S. Pat. No. 6,640,792 describes a rotating shaft mounted coalescing filter at a vent from a crankcase. The coalescing filter separates oil droplets from the gas. The rotating coalescing filter has a peripheral gas entry from the crankcase and an axial gas outlet. Coalesced liquid is centrifuged back peripherally to the crankcase.

U.S. Pat. No. 3,045,411 describes a rotary centrifugal separator for removing entrained liquids from a flow of gaseous fluid from the crankcase to the firing chamber in an internal combustion engine. The gaseous fluid is pumped radially inwards through a rotating coalescing filter and ejects the liquid radially outwards, thereby separating the entrained liquid from the gas. WO2009099339 A1 describes a separation device or unit for separating liquid from an inlet flow which mainly contains gas, the separation device comprising a container or a pipe section with an outlet for gas from the container or the pipe section, an outlet for liquid from the container or pipe section and an inlet for the inlet flow to the container or pipe section. The separation device further comprises: a flow manifold arranged to receive and put the inlet flow in movement towards a porous pipe body extending towards the gas outlet and arranged to receive the inlet flow, wherein part of the flow is flowing through the tubular body to the gas outlet, while the remaining of the flow is flowing through the porous wall of the tubular body, and an annular space consisting of the volume between the tubular body and the container wall or pipe section, the annular space is open for gas flow towards the gas outlet.

Measurements and comparisons of separation efficiency have been published in C. Verlan (1989): "Performance evaluation of impingement gas-liquid separators in Multiphase Flow" in Proceedings of the 4th International Conference. The paper shows percentage separation efficiency versus superficial gas velocity (Ug) expressed in m/s for a velocity range between 2.0 m/s and 4.5 m/s for an air/water system, please see below with respect to FIG. 16. Further, separation efficiency is also discussed in the document "Gas/Liquid Separation Technology" by Sulzer Chemtech, and shows percentage separation efficiency versus gas load factor (GLF) values between 0.0 and 0.3 m/s, please see below for FIG. 17.

SHORT SUMMARY OF THE INVENTION

Some of the problems in the background art are solved by the invention which is a separator for separating a fluid flow of gas with droplets comprising an inlet for said gas with droplets to a rotor having an axis and comprising a mesh for coalescing said droplets and releasing coalesced liquid from a peripheral part of said rotor. Some of the novel features of the invention are:

said mesh generally forming an axial passage for said gas from said inlet and through said rotor (4), to an outlet for liquid depleted gas, and said rotor with said mesh for transporting said coalesced liquid laterally out of said axial passage to a wall arranged for receiving said coalesced liquid.

In one embodiment of the invention[,] the peripheral part of the rotor is liquid permeable. The mesh may in an embodiment be structurally self-supporting, generally forming the main part of the rotating body.

In an advantageous embodiment of the invention[,] the rotor with the mesh is arranged for centrifugally moving the coalesced liquid laterally out of the axial passage of the gas (G) to a radial passage to a liquid collecting wall arranged for separately receiving the coalesced liquid. The wall may be laterally arranged relative to the rotor axis.

In an advantageous embodiment of the invention[,] the rotor comprises an open-ended rotating barrel for structurally supporting the mesh. The barrel is cylindrical according to an embodiment of the invention, but other shapes may be used such as tapered or rounded rotational bodies.

In a further advantageous embodiment of the invention[,] the separator's barrel has a peripheral wall which is permeable for said coalesced liquid.

An advantage of an embodiment of the invention is that gas may pass axially, straight through the rotor mesh while droplets are coalesced and removed by the rotating mesh, and may be collected by the surrounding wall and drained therefrom.

Another advantage of an embodiment of the invention is that as liquid is centrifuged by the rotating mesh and allowed to escape radially out of the path of the flow, the risk of re-entrainment of droplets into the gas stream is significantly reduced because the droplets do not reside for long time within the perimeter of the rotor. The lateral opening in the lateral wall of the wire mesh helps to remove the liquid more efficiently than by the dripping of the big droplets in the background art. Furthermore this avoids the entrainment of the big droplets. Avoiding flooding of the mesh by removing the liquid may thus avoid pressure peaks due to flooding.

Another advantage of the invention is that instead of the coalesced liquid being forced upstream against the incoming gas flow as described in some of the background art, the liquid film formed and the gas will move with reduced relative velocities through the mesh, thus coalesced fluid is quickly removed and little or no liquid film forms. A significantly reduced shear effect of the gas flow on the liquid film results. This may reduce the problem of re-entrainment of liquid back into the gas flow.

An advantage of the invention is the low pressure drop between the inlet and the outlet.

An advantage of an embodiment of the invention is a pressure alignment tube leading from the liquid receiving chamber about the rotor and back through a wall to the downstream gas outlet so as for controlling the flow to run axially through the separator.

The separator according to the invention may significantly improve the device of US2006/0225386 as the separator according to the invention will rapidly and continuously remove the coalesced liquid in the generally radial directions, instead of running the risk of blocking the longitudinally arranged pipes of the US-application.

An advantageous and surprising effect of the device according to the invention is that the coalescing mesh in some instances removes droplets from the gas flow even when rotating slowly or not rotating at all. Liquid is coalesced in the rotor (4) and liquid is drained to the collecting tank even with the rotating coalescing meshed halted, and the gas flowing through is depleted in its liquid content.

SHORT FIGURE CAPTIONS

The invention is illustrated in the attached drawings, of which:

FIG. 1 illustrates an enveloped rotating mesh with a gas inlet with a collector wall arranged coaxially with the axis of the rotating mesh.

FIG. 2 is an illustration of a rotatable mesh with an inlet portion for a gas flow with droplets illustrated from the left side and exhibiting the property of coalescing the droplets from the gas flow and an outlet for liquid depleted gas illustrated towards the right side. The rotatable mesh is provided with a permeable envelope forming a surface about and rotatable with the rotatable mesh. The envelope shown is cylindrical but other shapes such as a rotor with tapered or rounded ends are envisaged.

FIG. 3 is similar to FIG. 1 and illustrates a rotatable wire mesh. Interstices formed by the space between the wires are generally continuous throughout the wire mesh and forming escape paths to the parts of the interstices called apertures in the surface of the rotor.

FIG. 4 illustrates a longitudinal section of a pipe with an enveloped rotating mesh held in bearings in upper and lower delimiting plates forming a collector compartment about the rotating mesh in the pipe.

Figure 8:
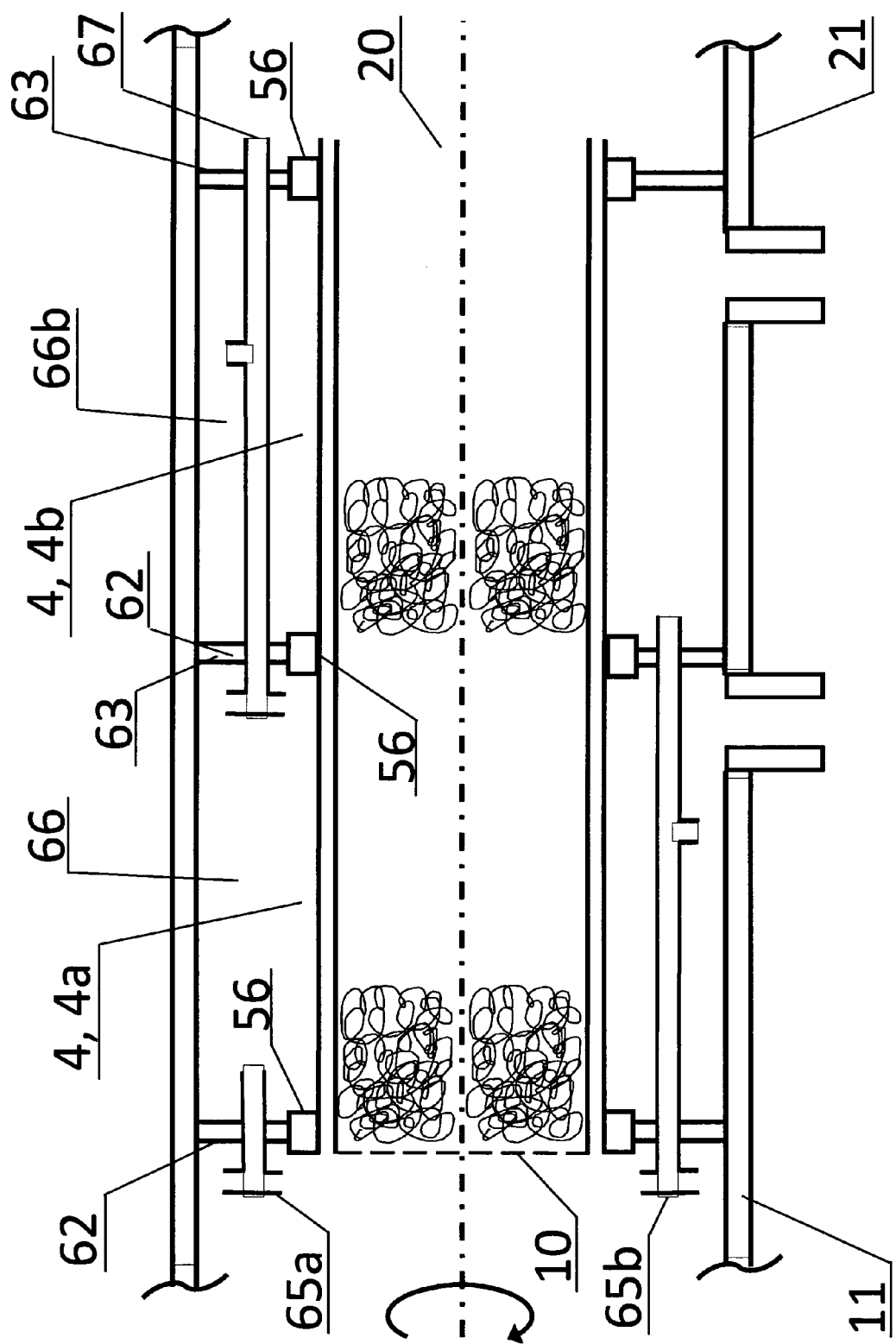

FIG. 8 is a longitudinal section trough a stacked or cascading arrangement of a rotating mesh arranged rotating within two separately drained collector compartments separated by an intermediate partition wall forming a wall for the collector compartment about the first part of the rotating mesh and also forming a wall for a consecutive collector compartment. The collector compartments may be provided with separate drain outlets for separated liquids or a common outlet. Further the separators may be provided with separate recirculation flow tubes for aligning gas pressures.

Figure 9:
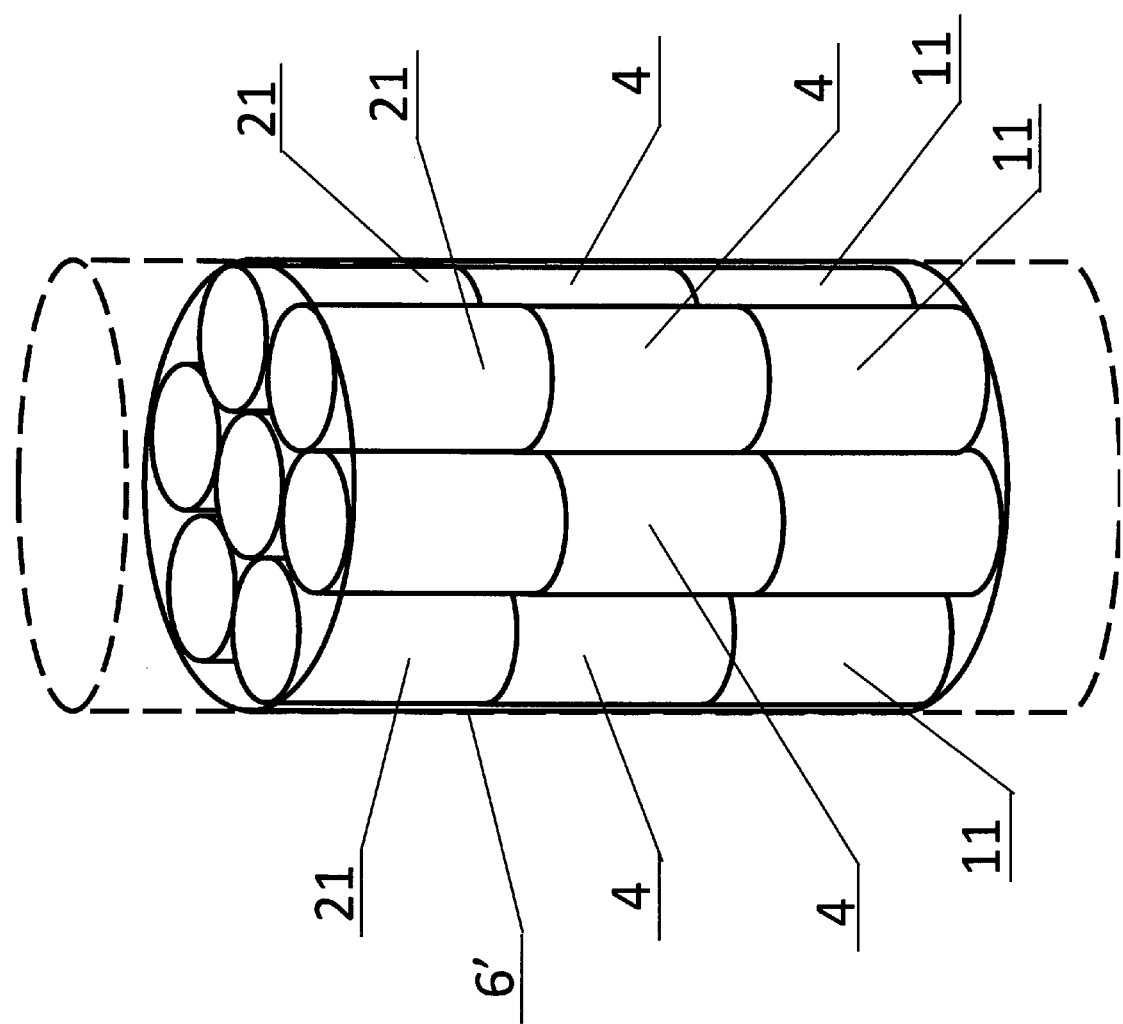

FIG. 9 illustrates an embodiment of the invention comprising a bundle of separators arranged to work in parallel. The bundle may be arranged within a common enveloping pipe or tank.

Figure 10:
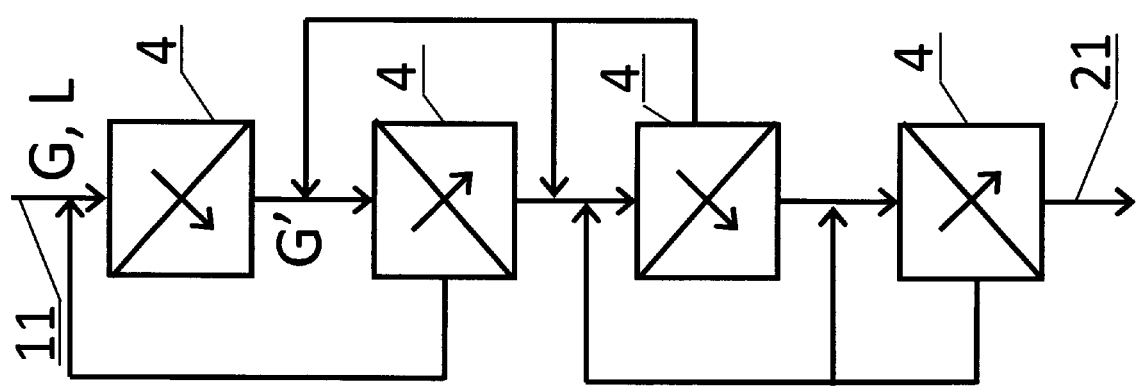

FIG. 10 is a schematic of a series of separators with recirculation pipes.

Figure 11:
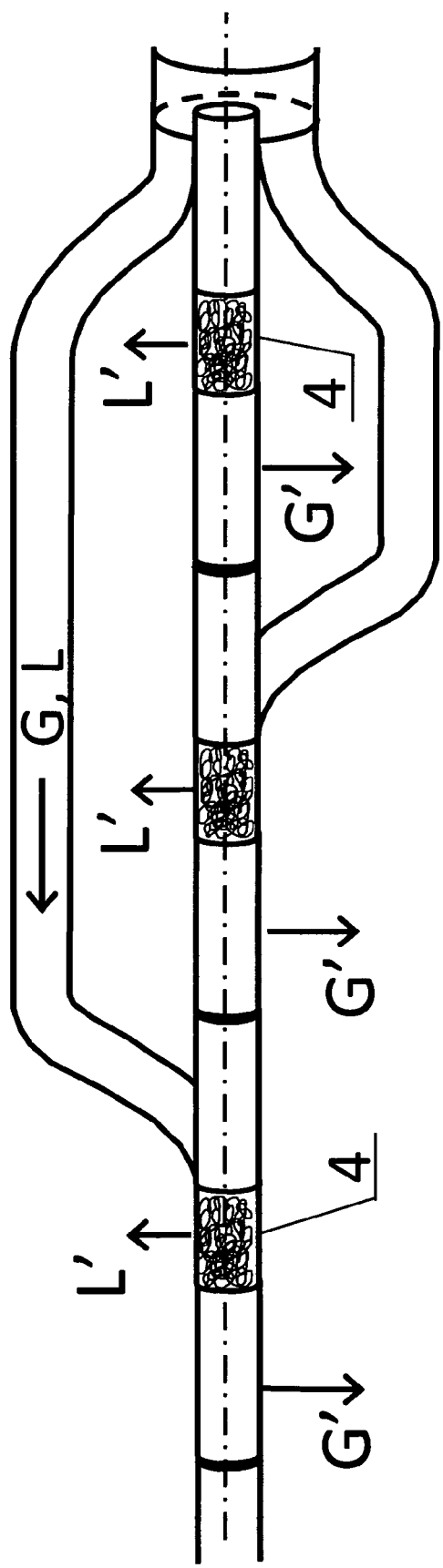

FIG. 11 is an illustration of a series of separators arranged consecutively and working on a large flow to be separated which is split and sent to different separators. The separators may be arranged generally along the same axis. Further, the separators may be arranged working on each their separate portion of the flow.

Figure 12:
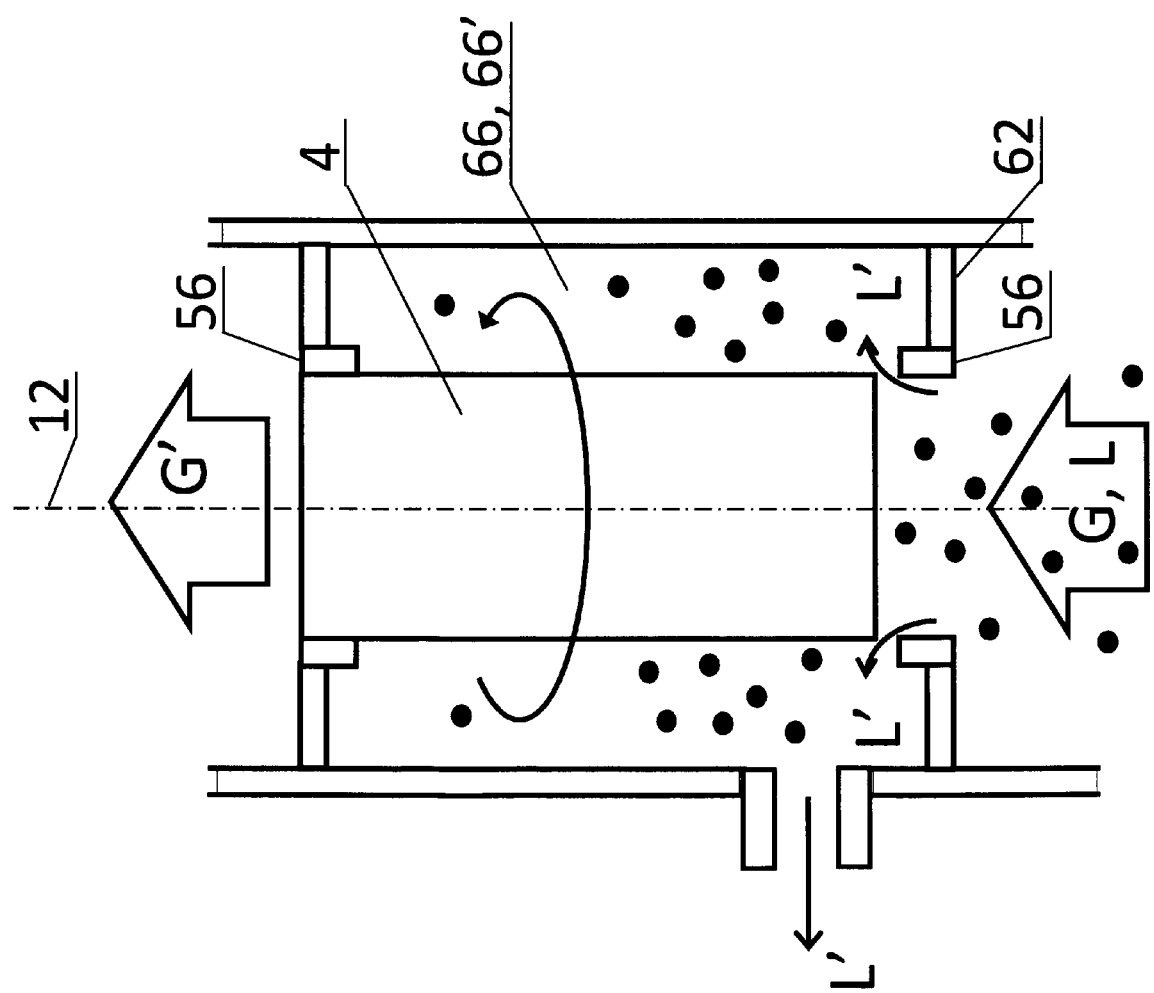

FIG. 12 is a section of an embodiment of the invention in which there is a radial gap at the upstream part of the mesh.

Figure 13:
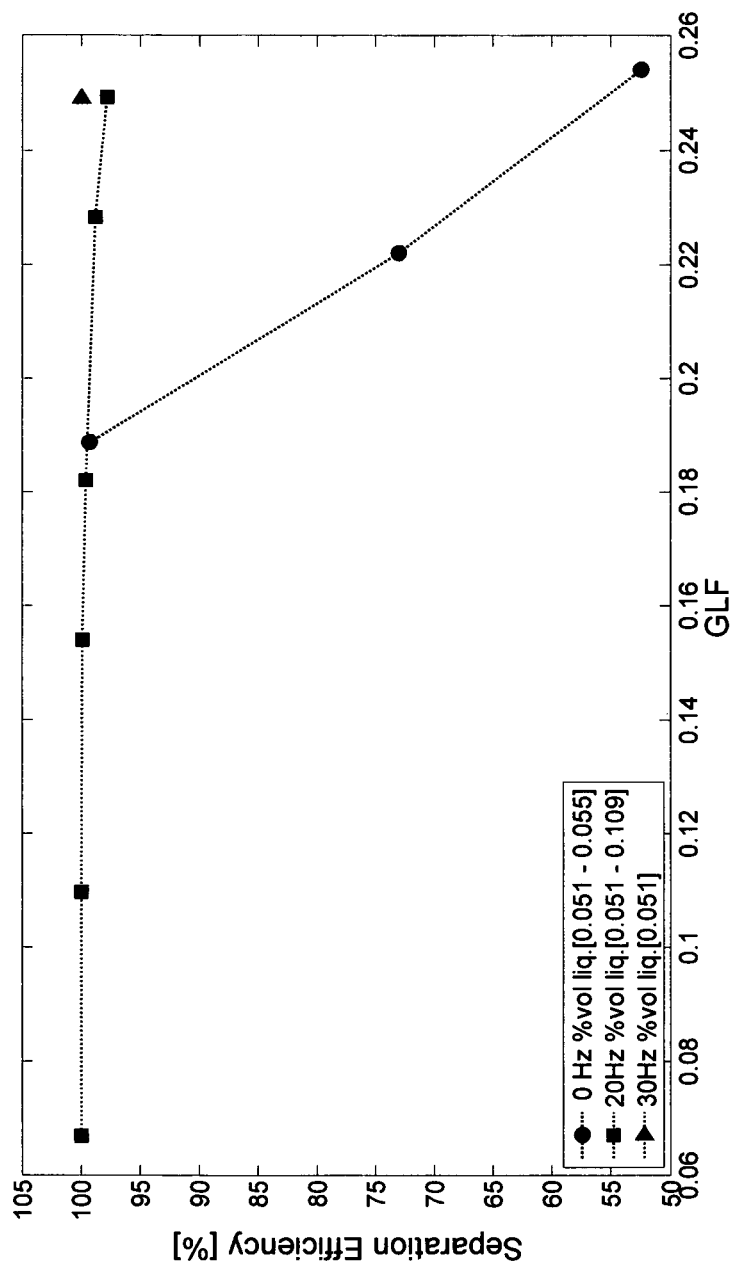

FIG. 13 shows percentage separation efficiency versus gas load factor (GLF) values between 0.06 and 0.26 m/s for an embodiment of the invention.

Figure 14:
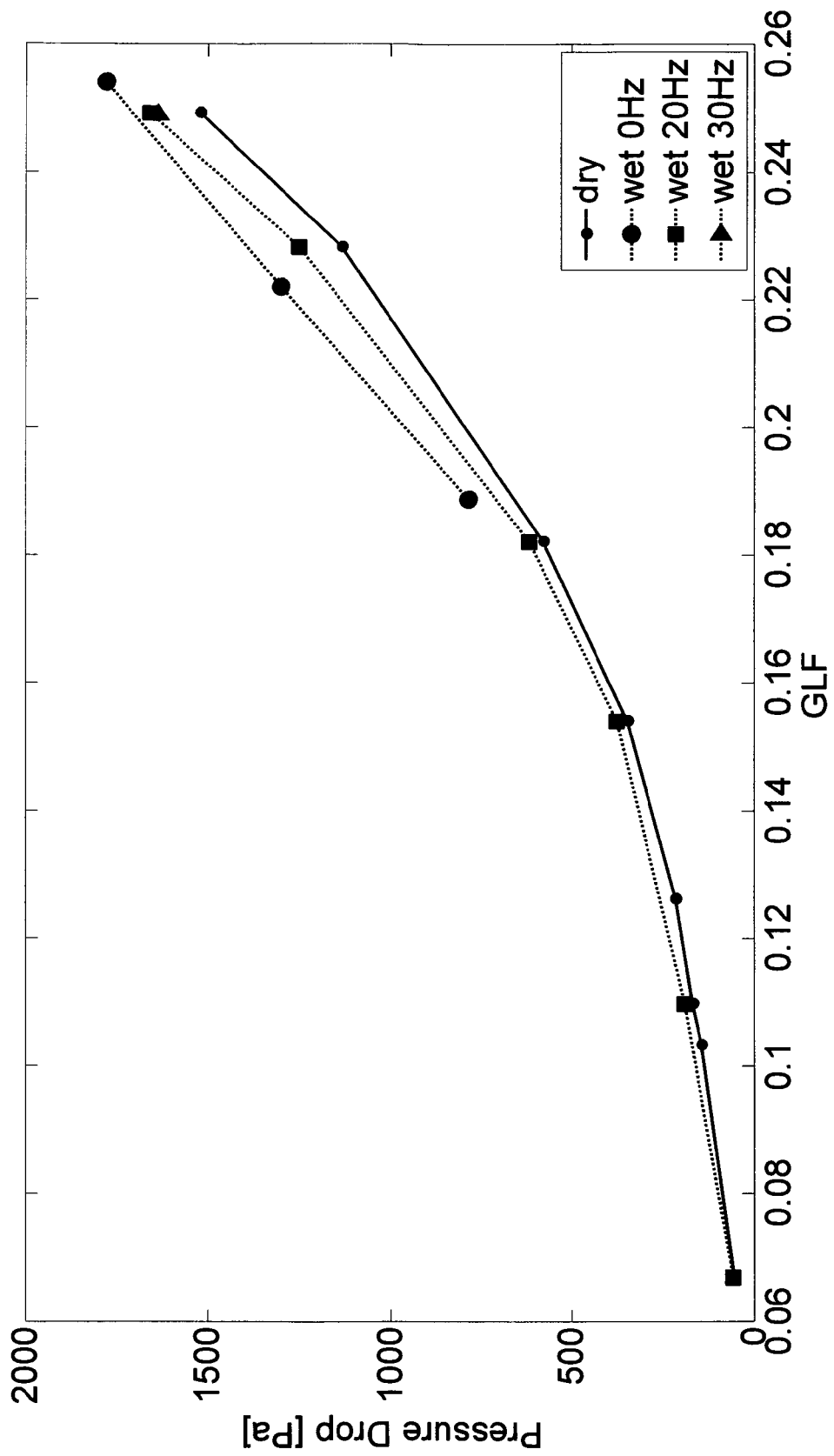

FIG. 14 shows pressure drop versus gas load factor, GLF, for the same GLF values as used in FIG. 13 for an embodiment of the invention.

Figure 15:
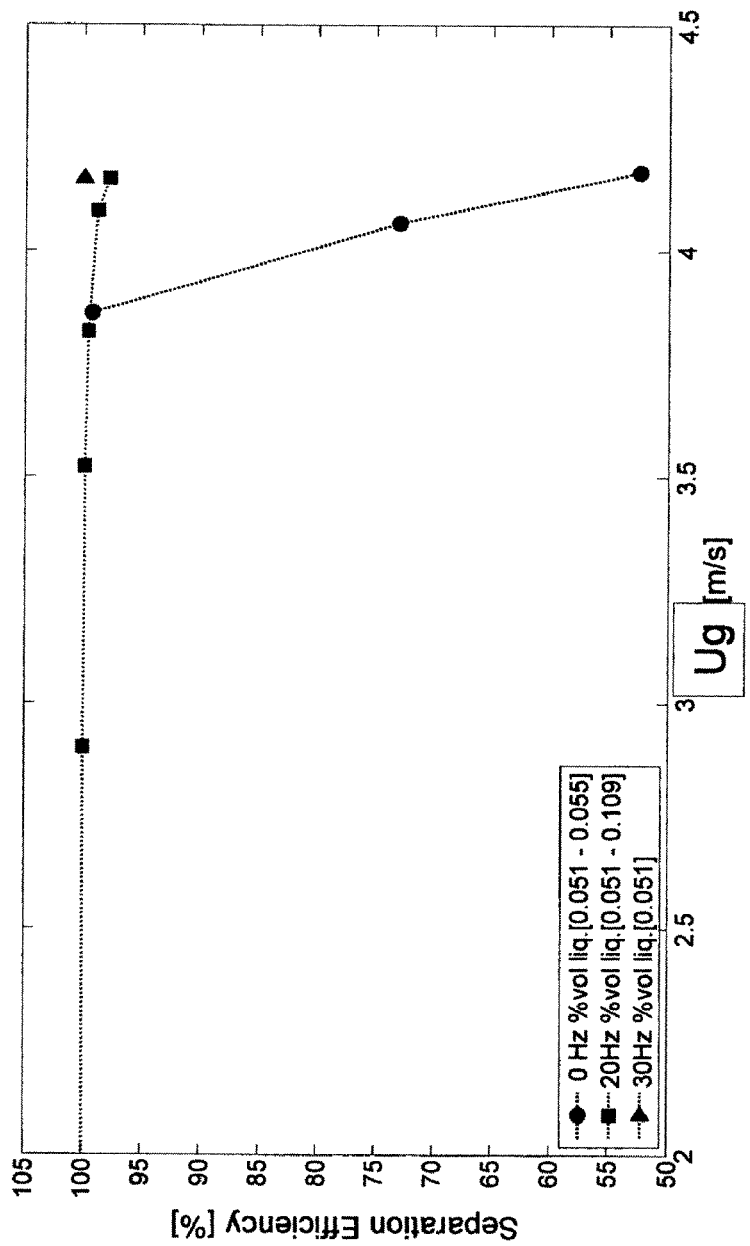

FIG. 15 shows percentage separation efficiency versus superficial gas velocity (Ug) expressed in m/s for a velocity range between 2.0 m/s and 4.5 m/s for an embodiment of the invention.

Figure 16:
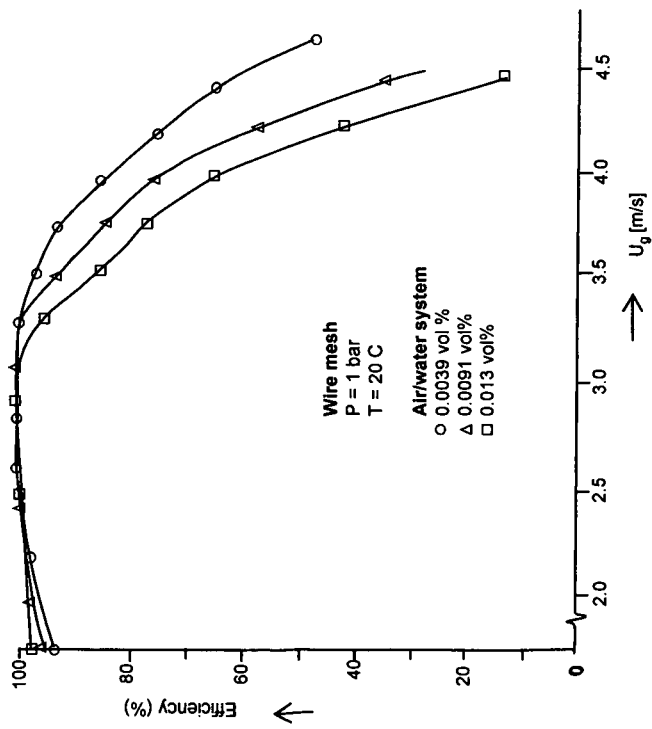

FIG. 16 is redrawn from C. Verlaan (1989), Performance evaluation of impingement gas-liquid separators in Multiphase Flow, Proc. of the 4th International Conference, and shows percentage separation efficiency versus superficial gas velocity (Ug) expressed in m/s for a velocity range between 2.0 m/s and 4.5 m/s for an air/water system.

Figure 17:
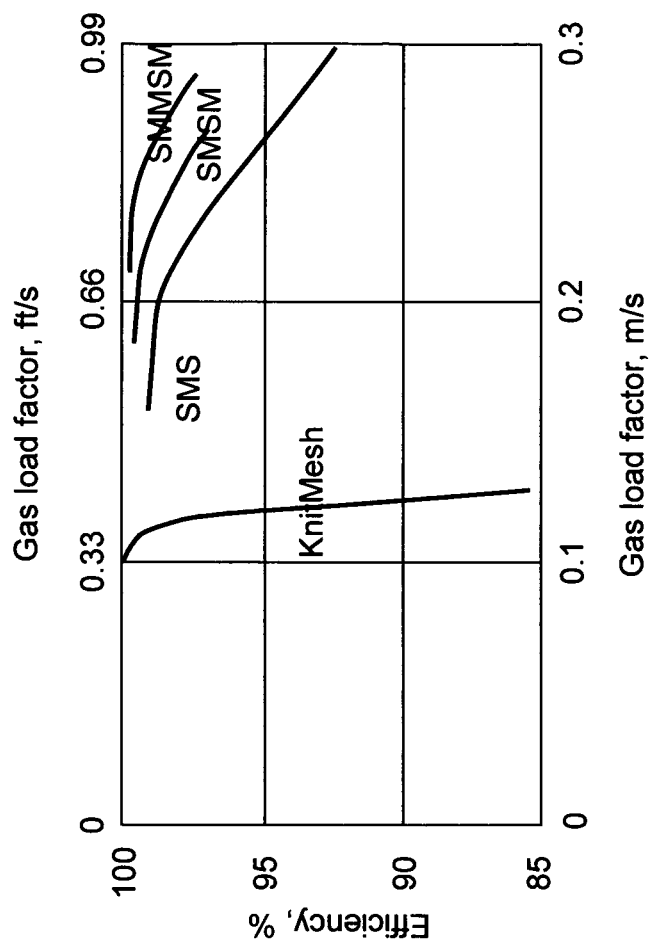

FIG. 17 is redrawn from a sales brochure called "Gas/Liquid Separation Technology" by Sulzer Chemtech, and shows percentage separation efficiency versus gas load factor (GLF) values between 0.1 and 0.3 m/s.

DESCRIPTION OF EMBODIMENTS OF THE INVENTION

Figure 1:
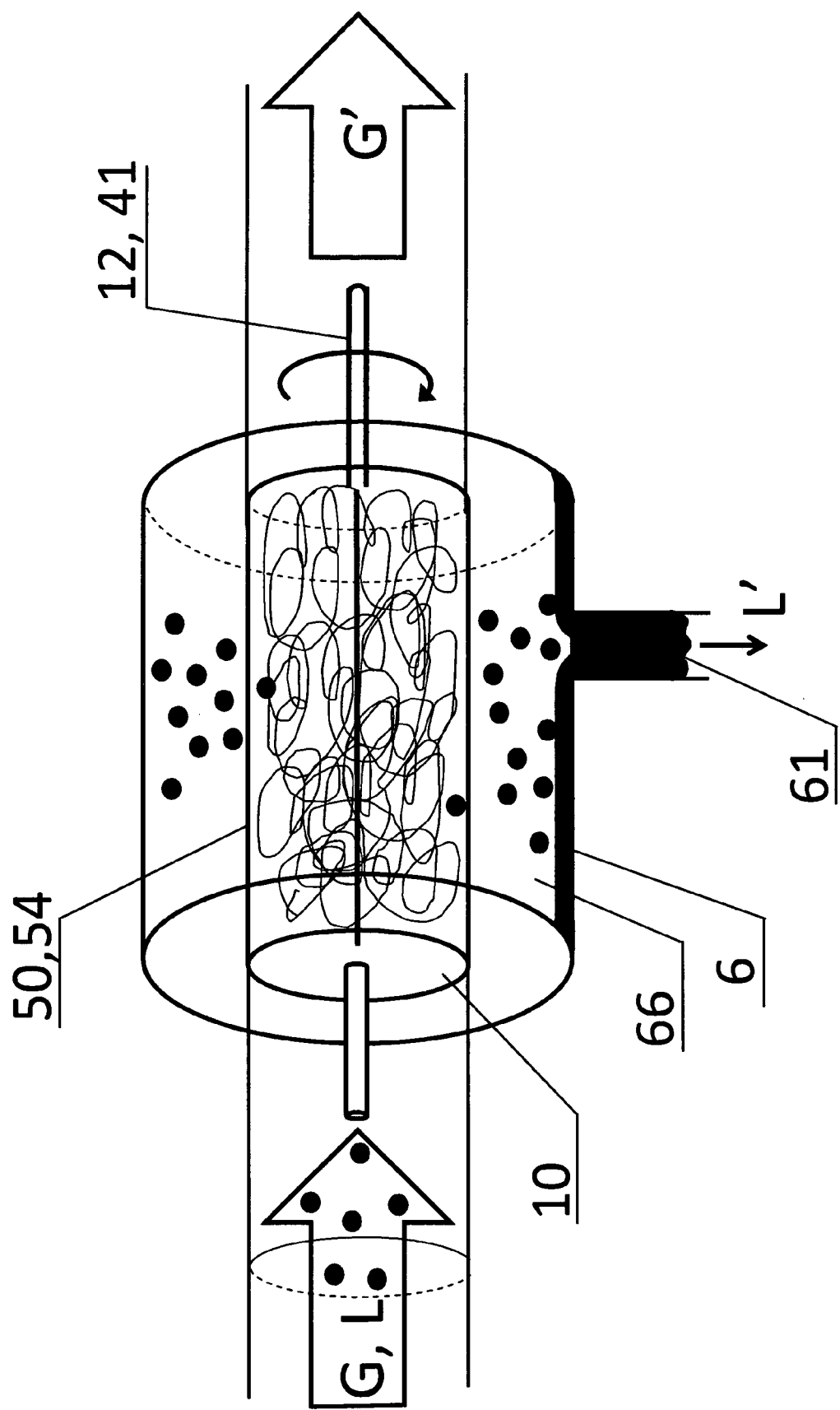

Embodiments of the invention are described below. The embodiments of the invention are illustrated in the above mentioned drawings. In a basic embodiment of the invention, such as illustrated in FIG. 1, a separator for separating an input fluid flow of gas (G) with droplets (L) is shown. By using the term "droplets" a generally dispersed phase is meant. The dispersed media may include a number of objects such as some sand or solid particles, or such as liquid sprays, droplets, or even liquid lumps. For ease of understanding, droplets is used in the following. The embodiment of the separator comprises an inlet channel (11) for the gas with droplets (G, L) to an inlet (10) to a rotor (4). The rotor (4) comprises a mesh (5) for coalescing said droplets (L) and releasing coalesced liquid (L') from a permeable peripheral part (50) of said rotor (4). The rotor (4) is arranged for revolving about an axis (12). The mesh (5) as such may be a steel mesh or a piece of expanded metal, a high strength fibre mesh or the like which may withstand the mechanical forces of pressure gradient, rotational forces and erosion from the passing gas. The mesh (5) may be any porous, permeable media suitable for the separation task. The mesh (5) may be structurally self-supported.

Figure 6:
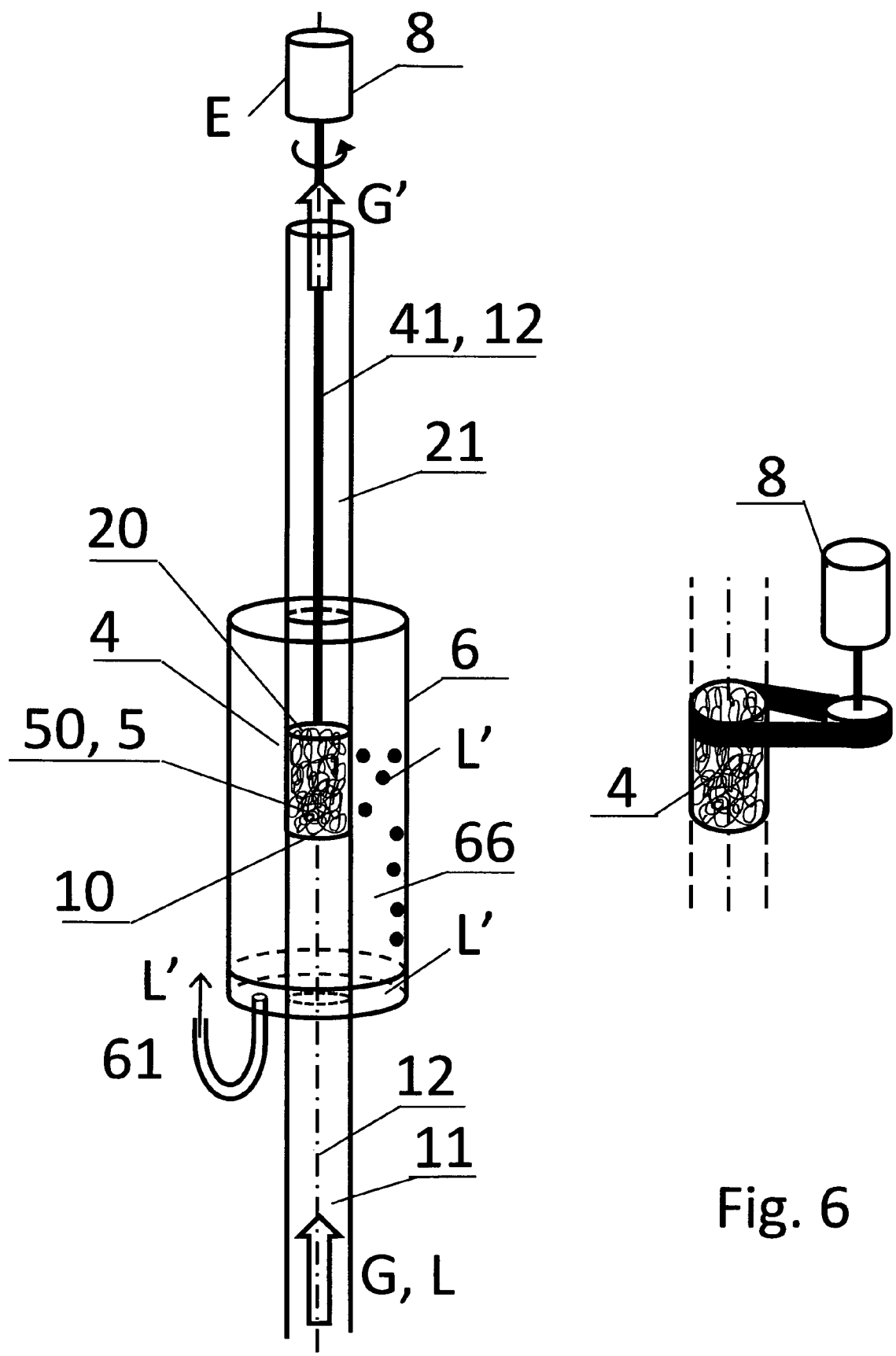
FIG. 6 is an illustration of an embodiment of the invention having a vertically arranged supply pipe for gas with droplets to the rotor and a vertically arranged pipe for the liquid depleted resulting gas. The collector wall forms part of a tank, here in a straight cylindrical embodiment, surrounding the inlet, the rotor with the mesh, and the outlet.
Figure 7:
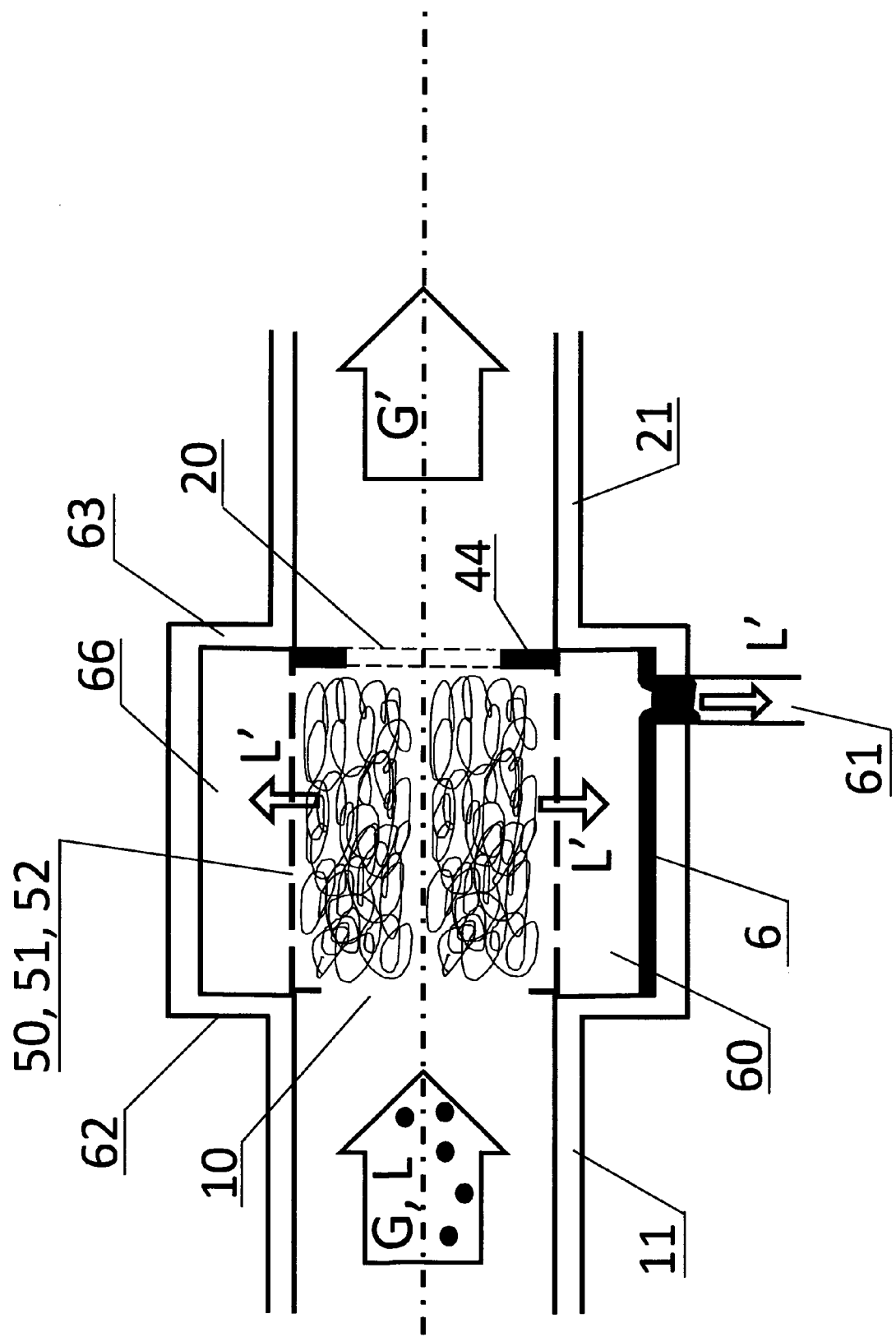
FIG. 7 is a longitudinal section of which a rotatable mesh cylinder is arranged flush with an inlet pipe for the gas containing droplets and the dry gas outlet, with a liquid drained cylindrical collector chamber generally forming a cylindrical widening of the axially arranged inlet and outlet pipes.

The separator according to the invention may be arranged with the rotor with a horizontal axis position as illustrated in FIG. 4, or with a vertical axis position as illustrated in FIG. 6 and in FIG. 12. The flow may also occur downwards through the rotor, or in any other intermediate direction.

The mesh (5) of the rotor (4) may be formed in a number of ways. One such way is to spiral wind up a mat and fixing the so formed rotor. Another way of forming the mesh (5) of the rotor (4) is to stack a series of circular mats. The so formed rotors (4) may be structurally self-supported or structurally supported by an open-ended barrel as illustrated e.g. in FIGS. 1 and 2.

Figure 2:
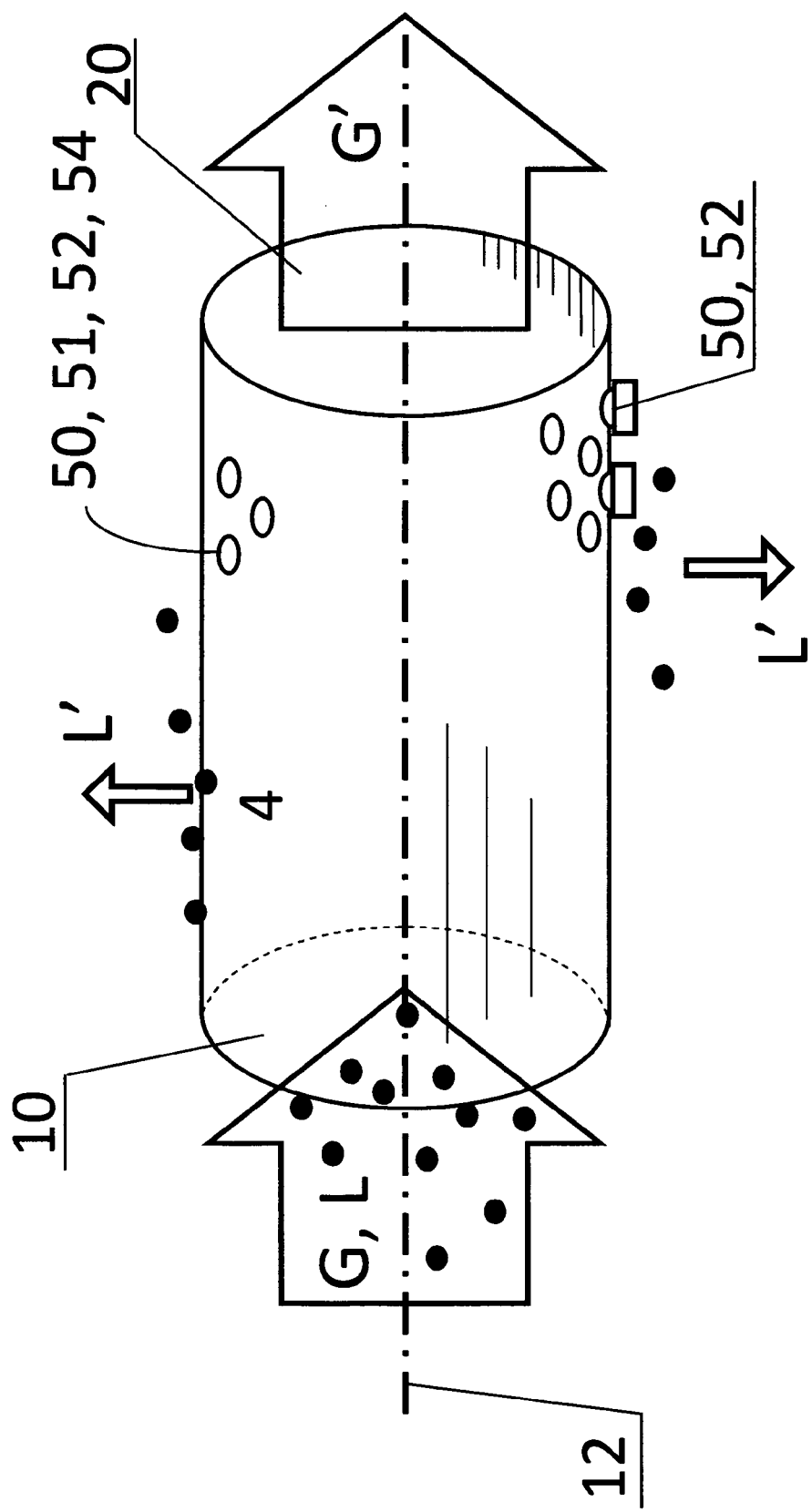

The mesh (5) generally forms an axial passage for the gas (G) from said inlet (10), through said rotor (4), to an outlet (20) to an outlet channel (21) for liquid depleted gas (G'), please see e.g. FIGS. 2, 3 and 4. In an advantageous embodiment of the invention, the outlet (20) for liquid depleted gas (G') is also axial.

The rotor (4) with the mesh (5) is arranged for moving the coalesced liquid (L') laterally out of the axial passage of the gas (G), thereby depleting the gas (G) to a liquid-depleted gas (G'), and leading the coalesced liquid separately through a passage to a wall (6) arranged for receiving said coalesced liquid (L').

A second reason for why there is less entrainment is that the gas and the liquid film will be rotating in the same direction such that there will be less relative movement than in ordinary separators in which the walls are static. I.e. the relative velocity between gas and liquid is reduced.

A surprising effect as shown by experimental results shown in FIG. 13, is that the coalescing mesh removes droplets from the gas flow even when rotating slowly or not rotating at all. This was discovered during testing of the principle of the invention in the laboratory. This phenomenon was later tested for at zero rotational speed. Further tests were conducted using rotational speeds of 20 Hz and 30 Hz. Liquid was coalesced in the rotor (4) and liquid was drained to the collecting tank even with the coalescing meshed halted, and the gas flowing through was depleted in its liquid content. There is a sharp decrease in efficiency for zero rotational speed of the mesh at a gas load fraction GLF at about 0.19 m/s, decreasing from a separation efficiency at near 100% to below 55% for GLF at about 0.25. For 20 Hz rotational speed of the mesh the separation efficiency remains at high separation efficiencies above 98% for GLF at 0.25, and at 30 Hz the separation efficiency remains above 99% for GLF=0.25.

Commercial separators from Sulzer are described in a sales brochure called "Gas/Liquid Separation Technology" by Sulzer Chemtech. The performance of some of those separators are illustrated in graphs in FIG. 17 and show percentage separation efficiencies versus gas load factors (GLF) values between 0.1 and 0.3 m/s. If the graphs of the background art in FIG. 17 are compared with the graphs of results from FIG. 13, FIG. 13 indicates that the separator according to the present invention has better performance.

The mesh (5) may not necessarily be self-supported. In an embodiment of the separator the rotor (4) may comprise a rotating barrel (54) for structurally supporting the mesh (5). The barrel (54) shown e.g. in FIG. 1 is of cylindrical shape but other rotational bodies are envisaged. The barrel (54) may have a peripheral wall (51) being permeable for said coalesced liquid (L') or provided with apertures (52) in fluid communication with the mesh (5), for releasing the coalesced liquid (L') peripherally. The barrel (54) supporting the mesh (5) may also be arranged to release the liquid (L') axially.

In an embodiment of the invention the separator with the liquid collecting wall (6) may be provided with one or more drains (61) for draining liquid (L') away from the separator device, please see FIG. 1, FIG. 4, FIG. 6 and FIG. 7. The liquid collecting wall (6) may form part of a tank (66) surrounding part of the inlet channel (11) with the inlet (10), the rotor (4), and part of the outlet channel (21) and said axial outlet (20), such as illustrated in FIGS. 4 and 6.

In another embodiment of the invention the liquid collecting wall (6) may form a general continuation of the gas flow pipe forming an intermediate portion of a wall of the inlet channel (11) and the outlet channel (21), please see FIG. 4 and a stacked or so-called "cascade" version illustrated in FIG. 8. A compartment (66') is formed which is separated from the inlet channel (11) by an internal separator plate ring (62) and separated from the outlet channel (21) by another internal separator plate ring (63), please see FIG. 4. In the stacked version shown in FIG. 8 a series of internal separator plate rings separate two or more compartments (66').

In order to recirculate some of the gas or to balance the gas pressure between the inlet channel (11) and the compartment (66), the tank or compartment (66, 66') may be provided with one or more recirculation pipes (65a, 65b) to the inlet channel (11), please see FIGS. 4, 8, and 10. The recirculation pipes may be separate or joined in the aperture to the inlet channel (11).

In order to balance the gas pressure between the outlet channel (21) and the compartment (66, 66'), the tank or compartment (66, 66') may be provided with one or more pressure alignment passage such as pipes (67) to the outlet channel (21), please see FIG. 4 and FIG. 8. The pressure between the outlet channel (11) and the annular space in the compartment (66, 66') surrounding the rotating mesh should be equalised. This may be required in order to make sure that there is no shortcut through the lateral parts of the mesh.

FIG. 14 shows pressure drop versus gas load factor, GLF for the same GLF values as used in FIG. 13. The pressure drop remains below 2000 Pascal (20 mBar) for all experiments using dry gas, wet gas at 0 Hz (static rotor), 20 Hz rotor speed and 30 Hz rotor speed. The dry gas has the lowest pressure drop. The wet gas has, for measurements between 0.19 m/s and 0.25 m/s the higher pressure drops, and the wet 20 Hz measurements are in between the values of the above. In general the pressure drop is low while the separation efficiency for the rotational experiments remain high, above 98%.

FIG. 15 shows percentage separation efficiency versus superficial gas velocity (Ug) expressed in m/s for velocity range between 2.0 m/s and 4.5 m/s for an embodiment of the invention. The graph corresponds in general to what is shown for GLF in FIG. 13. Tests were conducted using rotational speeds of 0 Hz (no rotation) 20 Hz and 30 Hz. Liquid was coalesced in the rotor (4) and liquid was drained to the collecting tank even with the coalescing meshed halted, and the gas flowing through was depleted in its liquid content. There is a sharp decrease in separation efficiency from near 100% for zero rotational speed of the mesh at superficial velocities Ug between about 3.9 m/s and 4.1 m/s, decreasing to below 55% for Ug about 4.2 m/s. For 20 Hz rotational speed of the mesh the separation efficiency remains at high separation efficiencies above 98% for Ug=4.2 m/s. At 30 Hz the separation efficiency remains above 99% for Ug=4.2 m/s. FIG. 16, which is redrawn from C. Verlan (1989), Performance evaluation of impingement gas-liquid separators in Multiphase Flow, Proc. of the 4th International Conference, and shows percentage separation efficiency versus superficial gas velocity (Ug) expressed in m/s for velocity range between 2.0 m/s and 4.5 m/s for an air/water system. These curves are for non-rotating meshes.

If the graphs of the background art in FIG. 16 are compared with the graph of results shown by the curve for 0 Hz (no rotation) and % vol liq. [0.051-0.055] from FIG. 15, FIG. 15 indicates that the separator according to the present invention has better performance. One example from the graph is that the wire mesh according to the invention experiences a high separation efficiency of up to almost 100% for a superficial velocity of more than 3.8 m/s while the prior art meshes, without lateral opening, experiences a separation of 75% at Ug about the same level and even a lower water content.

Figure 5A:
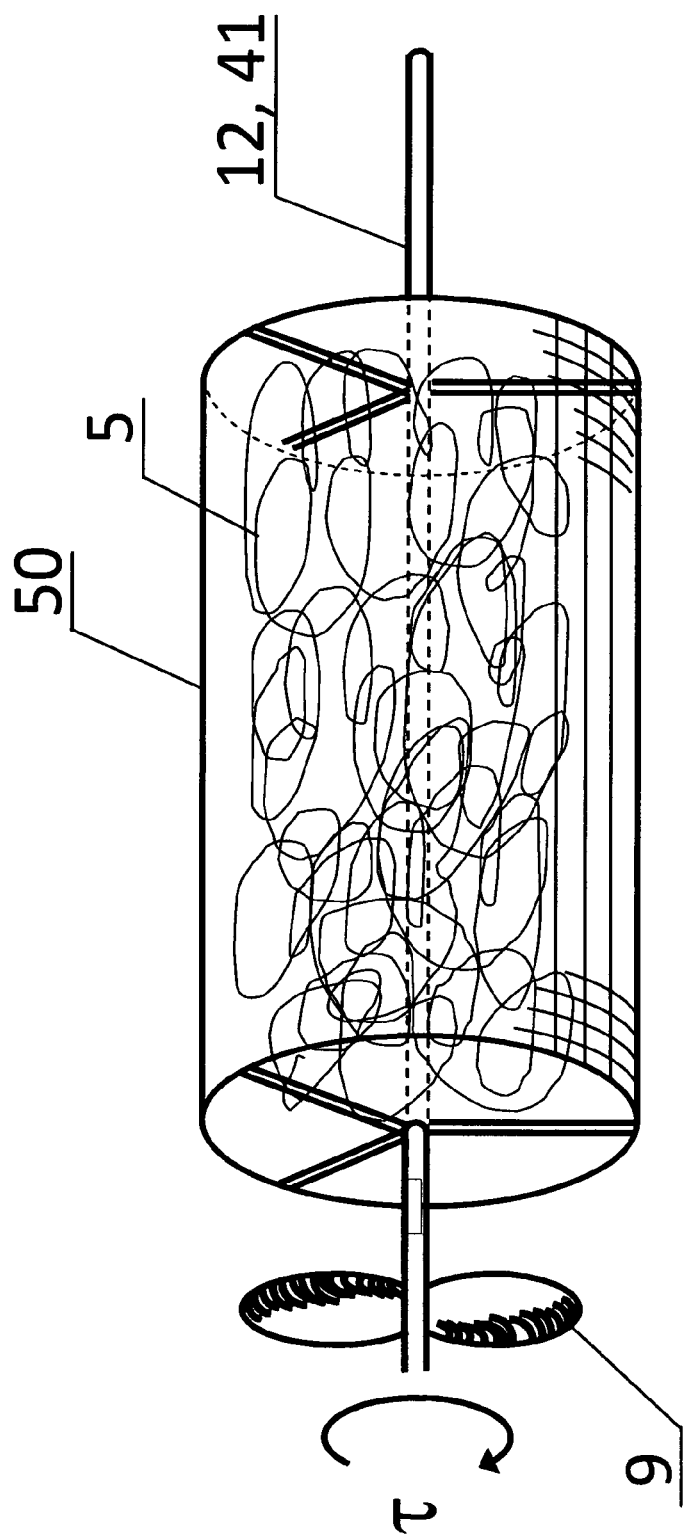
FIG. 5a is a perspective view of one embodiment of such a rotatable mesh held in a permeable wall, here provided with a mechanical axle. The wall may be cylindrical as illustrated.
Figure 5B:
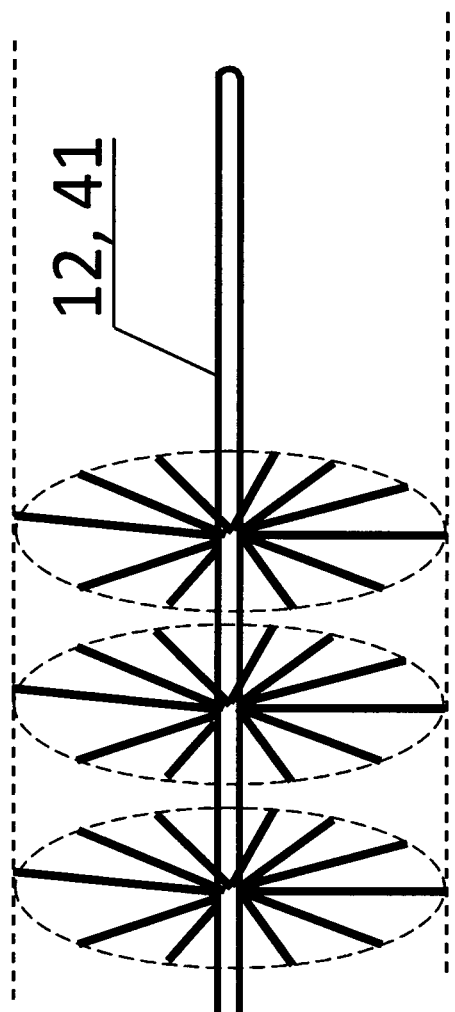
FIG. 5b illustrates an embodiment of a rotatable mesh comprising an axle holding regular sets of radially extending wires.
Figure 5C:
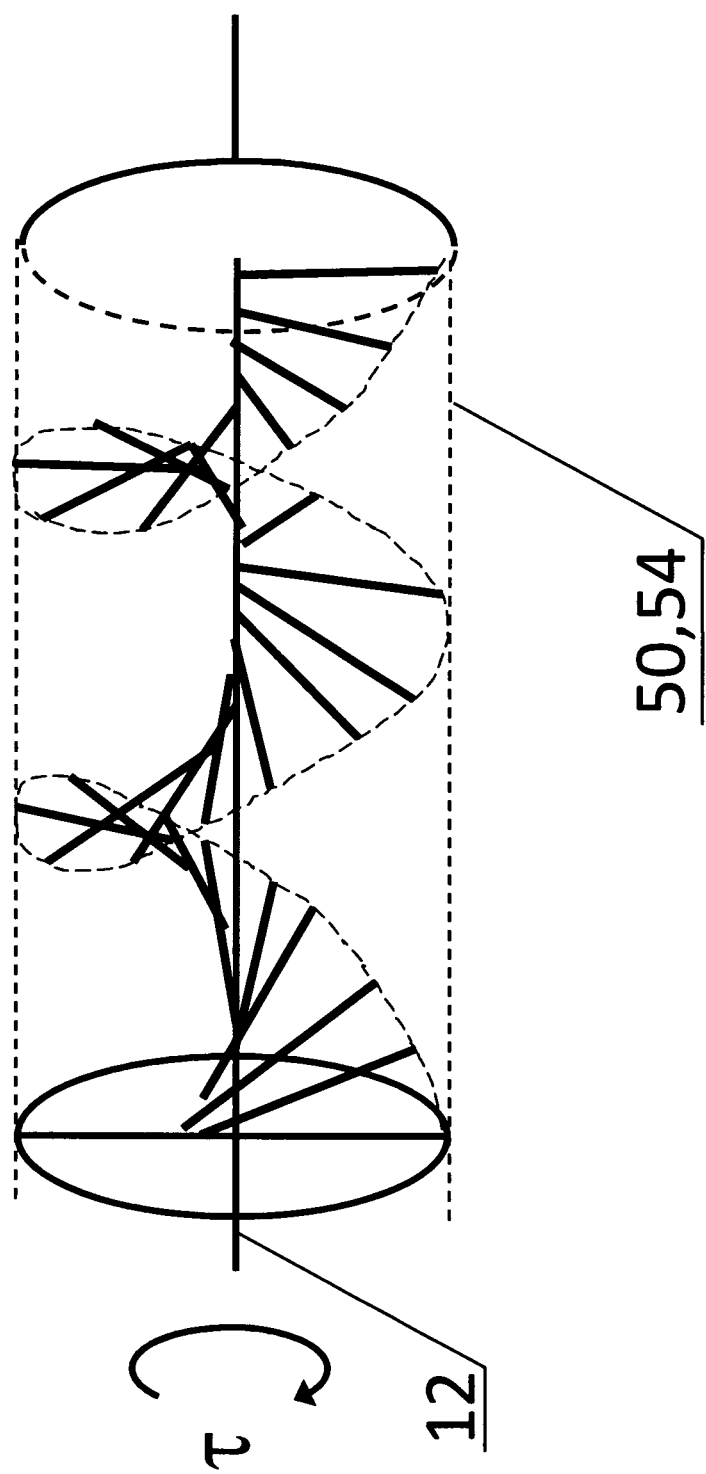
FIG. 5c illustrates an embodiment of a rotatable mesh assembly similar to the mesh of FIG. 5b, here with each wire of the mesh having one end arranged with even separations near and along an axis of the mesh assembly and an opposite end arranged near a helical path about the axis.

In an embodiment of the invention of which part is illustrated in FIG. 5b and c, the permeable mesh (5) forms a regular pattern such as radially extending wires from an axis, or diametrically arranged wires between barrel walls of the rotor (4), the wire ends arranged in a helical pattern on the barrel (54).

In another embodiment of the invention the permeable mesh (5) may be amorphous such as a steel mesh pad, steel wool or the like.

The separator[,] according to an embodiment of the invention, may have the rotor (4) arranged in an axle-less bearing (56) such as illustrated in Figs. 4 and 8. Such an arrangement provides a full cross-section available for the axially passing gas flow.

In the embodiments illustrated in FIGS. 1 and 6, the separator's rotor (4) comprises a rotating axle (41).

Independent of having an axle-less or axial bearing, the rotor (4) may be arranged for being driven by a motor (8) driven by externally provided energy (E), such as illustrated in FIG. 6. The position of the motor is illustrated downstream in FIG. 6, but the motor may be placed on the opposite side relative to the rotor. The rotor may also be arranged laterally with respect to the rotor as shown in the right part of FIG. 6.

In an embodiment of the invention shown in FIG. 5*a*, the rotor (4) may be arranged for being driven by a turbine (9) in the gas flow (G) itself. Arranging the mesh directly on a turbine such that the rotation of the mesh is directly coupled to the amount of gas therethrough is a possibility.

As illustrates in FIG. [7], the separator may be provided with baffle plates (44) arranged for preventing coalesced liquid (L) from being entrained with the depleted gas flow (G).

For improving the efficiency the separator according to the invention may comprise one or more consecutive rotors (4*b*) separated in separate consecutive compartments (66*b*, 66*b*'). This may be done in order to utilize a narrow confined space such as within a section of an existing pipe or downhole.

In one embodiment of the invention[,] the separator may have an inlet channel (11) for said gas with droplets (G, L) connected to a petroleum gas stream for separating oil droplets or water droplets from a gas flow.

Such a petroleum separator may have its petroleum gas stream through the inlet channel (11) connected to a petroleum production wellhead, either arranged subsea or on a dry tree on a production platform.

In another embodiment of the invention[,] the separator may be arranged downhole, with its inlet channel (11) for gas/oil or gas/water and the outlet channel (21) forming part of a petroleum fluid production pipe within a petroleum well, and the coalesced liquid drain preferably leading to the surface if liquid is oil, and the coalesced liquid drain leading back into the well if the coalesced liquid is water, if the pressure gradient allows to do so.

In an embodiment of the invention[,] the inlet channel (11) for the gas with droplets (G, L) is connected to a gas source comprising liquidized $CO_2$ from gas. This may be applied for separating carbon dioxide from exhaust gases after expansion. A separator according to the invention may be used for separation out liquefied droplets such as in the production of LNG (liquefied natural gas) or LPG (liquefied petroleum gas) in which several cycles of cooling are used. Further, liquefaction and separation of components of air may be conducted using the invention. In general, the separator according to the invention may be arranged for separating any condensable gas in a mixture being susceptible to being separated out. In one embodiment of the invention the separator may be used for separating water droplets from breathing air, e.g. during tracheotomy.

FIG. 9 illustrates an embodiment of the invention comprising a bundle of separators. The gas flow may run either way. The separators illustrated may be arranged to work in parallel. The bundle may be arranged within a common enveloping pipe or tank (6') at least for receiving the resulting liquid (L'). The inlet channels (11) may be connected to a common inlet manifold, and the outlet channels (21) may be connected to another outlet manifold. The enveloping pipe or tank (6') may work as a common liquid collector wall, or each separator may have their own collector wall (6). The rotors (4) may be separately driven by turbines or motors or driven by a common motor.

FIG. 10 is a schematic of a series of separators with recirculation pipes. This is in order for making a cascade in which a portion of the gas flow is recirculated.

FIG. 11 is an illustration of a series of separators (4) arranged consecutively and working on a large flow (G, L) to be separated into liquid (L') and liquid depleted gas (G'). The large flow (G, L) is split ahead of a first separator. A first part of the split flow is sent to the proximal first separator, and a branched-off part of the flow is relayed to another separator more distally arranged. The separators may be arranged generally along the same axis as shown here. The separators may thus be arranged working on each their separate portion of the flow.

In an embodiment the separator according to the invention may be used in the gas outlet from a gravitation settling tank in order to remove entrained droplets from the gas.

According to an embodiment of the invention the rotor (4) may be held in magnetic bearings.

FIG. 12 is a section of an embodiment of the invention of which a rotor (4) is arranged in an axle-less bearing (56) and of which there is a radial gap at the upstream part of the mesh in order to allow the gas flow (G, L) exert a lateral pressure on the liquid (L') formed at the bottom of the annular chamber (66, 66').

The invention claimed is:

1. A separator for separating a fluid flow of gas with liquid droplets, comprising an inlet into a chamber for said gas with droplets to a rotor, said rotor having an axis and comprising a mesh for coalescing said droplets and releasing coalesced liquid from a liquid permeable peripheral part of said rotor, characterized by said mesh generally forming an axial passage for said gas along the axis from said inlet, through said rotor, to an outlet for liquid depleted gas, and said rotor with said mesh adapted to transport said coalesced liquid laterally out of said axial passage toward a chamber wall surrounding the mesh arranged for receiving said coalesced liquid, and a radial gap in said chamber upstream of the rotor adapted to allow gas flow to exert a lateral pressure on droplets from the inlet through the upstream gap generally toward the chamber wall surrounding the mesh.

2. The separator of claim 1, comprising an inlet channel for said gas with droplets to said inlet.

3. The separator of claim 1, comprising an outlet channel from said outlet.

4. The separator of claim 1, said outlet for liquid depleted gas being axial.

5. The separator of claim 1, said rotor comprising a rotating barrel for structurally supporting said mesh.

6. The separator of claim 1, said rotor having a peripheral wall being permeable for said coalesced liquid.

7. The separator of claim 6, said peripheral wall provided with apertures in fluid communication with said mesh, for releasing said coalesced liquid.

8. The separator of claim 1, said wall provided with a drain for draining liquid.

9. The separator of claim 5, said rotor having a peripheral wall being permeable for some of said coalesced liquid, and said wall forming part of a tank surrounding part of an inlet channel with said inlet, said rotor, and part of an outlet channel and said outlet.

10. The separator of claim 2, comprising an outlet channel from said outlet, and said wall forming an intermediate portion of a wall of said inlet channel and said outlet channel, forming a compartment which is separated from said inlet channel by an internal separator plate ring and separated from said outlet channel by an internal separator plate ring.

11. The separator of claim 9, said tank comprising a recirculation pipe to said inlet channel.

12. The separator of claim 1, said mesh forming a regular pattern.

13. The separator of claim 1, said mesh being amorphous.

14. The separator of claim 1, said rotor arranged in an axle-less bearing.

15. The separator of claim 1, said rotor comprising a rotating axle.

16. The separator of claim 13, comprising a magnetic bearing.

17. The separator of claim 1, said rotor arranged for being driven by a motor driven by externally provided energy.

18. The separator of claim 1, said rotor arranged for being driven by a turbine in said gas flow.

19. The separator of claim 1, said separator provided with baffle plates arranged for preventing coalesced liquid from being entrained with said depleted gas flow.

20. The separator of claim 1, comprising one or more consecutive rotors separated in separate consecutive compartments.

21. The separator of claim 2, said inlet channel for said gas with droplets connected to a petroleum gas stream.

22. The separator of claim 21, said petroleum gas stream through said inlet channel connected to a petroleum production wellhead.

23. The separator of claim 21, said inlet channel and an outlet channel connected to a petroleum fluid production pipe within a petroleum well.

24. The separator of claim 1 including an inlet channel for being connected to a gas source comprising condensable droplets for separating said droplets from a mixture of condensable gases.

25. The separator of claim 24, said inlet connected to a source of gas comprising liquidized $CO_2$ droplets.

26. The separator of claim 25, said inlet connected to a source of gas comprising liquidized LNG or LPG droplets.

27. The separator of claim 10, said compartment comprising a recirculation pipe to said inlet channel.

28. The separator of claim 14, said axle-less bearing comprising a magnetic bearing.

* * * * *